United States Patent [19]

Lohr

[11] Patent Number: 5,704,295
[45] Date of Patent: Jan. 6, 1998

[54] ARM FOR AUTOMATICALLY GUIDING A ROAD VEHICLE ALONG A GUIDE RAIL

[75] Inventor: Robert Lohr, Hangenbieten, France

[73] Assignee: Lohr Industrie, Hangenbieten, France

[21] Appl. No.: 676,337

[22] PCT Filed: Jan. 19, 1995

[86] PCT No.: PCT/FR95/00057

§ 371 Date: Jul. 23, 1996

§ 102(e) Date: Jul. 23, 1996

[87] PCT Pub. No.: WO95/19904

PCT Pub. Date: Jul. 27, 1995

[30] Foreign Application Priority Data

Jan. 20, 1994 [FR] France ................. 94 00732

[51] Int. Cl.[6] ................................................ B61C 11/00
[52] U.S. Cl. ...................... 105/72.2; 104/243; 104/244; 104/245
[58] Field of Search ............... 105/72.2, 215.1, 105/216; 104/145, 107, 120, 242, 243, 246, 244, 244.1, 245, 247

[56] References Cited

U.S. PATENT DOCUMENTS

| 128,597 | 7/1872 | Crew | 104/145 |
|---|---|---|---|
| 3,707,125 | 12/1972 | Milenkovic et al. | 104/244 |
| 3,730,105 | 5/1973 | Holley | 104/245 |
| 3,866,484 | 2/1975 | Dreshman | 105/244 |
| 3,942,449 | 3/1976 | Nelson | 104/242 |
| 4,048,925 | 9/1977 | Storm | 105/72.2 |
| 4,416,456 | 11/1983 | Knight | 104/244 |
| 5,024,163 | 6/1991 | Lenz | 104/243 |
| 5,156,639 | 10/1992 | Bostrom | 105/72.2 |

FOREIGN PATENT DOCUMENTS

| 0062370 | 10/1982 | European Pat. Off. . |
|---|---|---|
| 514718 | 3/1921 | France . |
| 2129052 | 10/1972 | France . |
| 1128765 | 4/1962 | Germany . |
| 1161157 | 1/1964 | Germany . |
| 1455512 | 3/1969 | Germany . |

Primary Examiner—Mark T. Le
Attorney, Agent, or Firm—Davis and Bujold

[57] ABSTRACT

An improved automatic guiding arm having a deformable hinged frame like construction controlled by an actuator. The actuator raises and lowers the end of the frame like construction which supports a pair of guide wheels in a "V" shaped arrangement for engaging a guide rail. The axially supported wheels may be mutually pivotable about a transaxial shaft and controlled by an angle control member hinged to the actuator. Through the angle control member the actuator can automatically control the transaxial pivoting and angle of the wheels as well as the tilt of the angle control member during raising and lowering operations of the guide arm. The guide arm is useful for automatically steering public transportation vehicles.

15 Claims, 8 Drawing Sheets

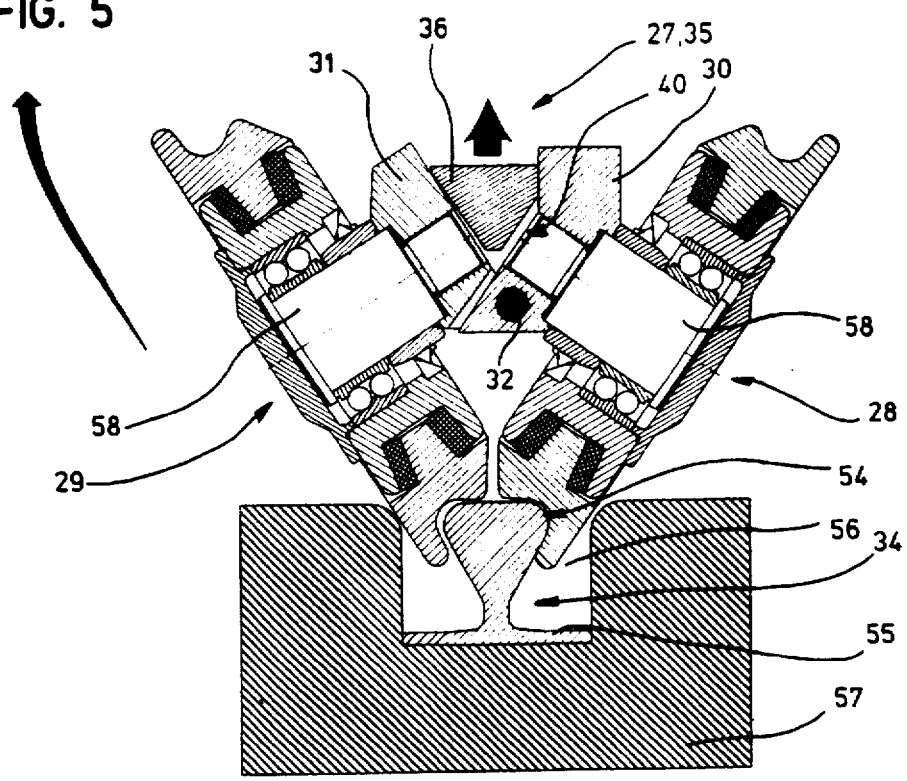
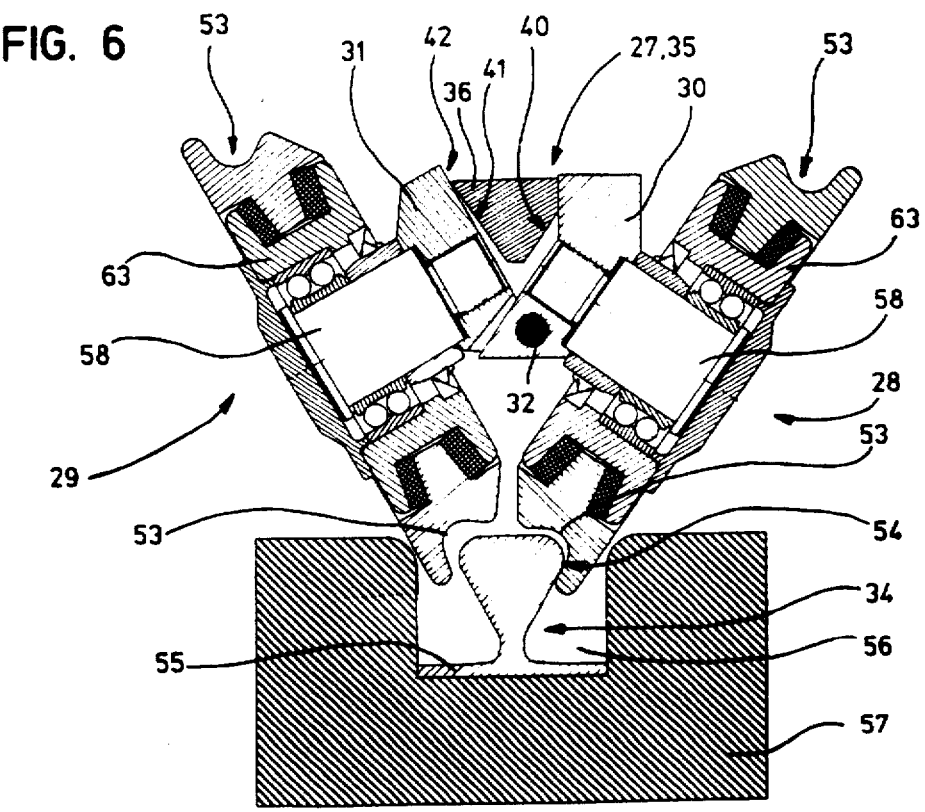

ARM FOR AUTOMATICALLY GUIDING A ROAD VEHICLE ALONG A GUIDE RAIL

BACKGROUND OF THE INVENTION

The present invention relates to an improved arm for automatically guiding a road vehicle along a guide rail.

The applicant has proposed a basic solution in prior French Patent Application No. 93 06491, relating to a unit for automatically guiding a road vehicle along a guide rail.

The prior art device will be described below to provide a better understanding of the improved embodiment proposed by this invention.

The previously patented automatic guide system comprises a lifting guide arm articulated to the end of the chassis of a road vehicle. At its front extremity, the guide arm has a guide head with means for propelling it along a guide rail on a roadway at the base of a gorge.

The guide arm is articulated to a structure at the front end of the chassis on two crossed pivot axles, one consisting of a rocker axle for raising the arm, and the other consisting of a vertical pivot axis for directional movement.

The body of the arm is formed of two juxtaposed longitudinal housings which are raised or lowered using an articulated actuator.

The front extremity of the housings has a guide head equipped with two interconnected guide wheels in a downward-pointing V-shaped arrangement, maintained at a fixed angle on the track.

SUMMARY OF THE INVENTION

There is a protective support in front of the guide head.

The aim of the present invention is to provide an improved arm wherein the guide wheels, also arranged in a "V", are pivotably articulated to each other, and in which there is a device to automatically engage and grip the guide wheels, maintaining them on the rail, as well as to automatically release and separate them in an initial phase before the arms are raised. This device also automatically locks the guide head in working position and locks the guide wheels on the rails. It is adjusted so the guide wheels grip the rail lightly after contacting it.

Additionally, the actuator controls a hinged unit consisting of a deformable parallelogram. The actuator controls all the functions, such as raising the arm, placing it in working position, positioning the guide wheels next to each other, and releasing them.

In addition to the general advantages described in the prior invention, the improved embodiment has many important, specific features.

The guide wheels are designed to absorb the slight separation occurring as they deviate on curves.

The device which releases and reconnects the guide wheels raises and lowers the arm quickly and precisely, and it engages and disengages the wheels from the rail smoothly.

The device which automatically locks and unlocks the mechanical grip maintaining the guide wheels on the rail edges completes the automatic operation of the directional guide system and eliminates the possibility of sudden shocks causing a derailment.

BRIEF DESCRIPTION OF THE DRAWING(S)

The technical characteristics and other advantages of the invention are outlined in the ensuing description, offered as a non-limiting example of one embodiment, with reference to the accompanying drawings, wherein:

FIGS. 5 and 6 are transverse cross-sections of a pair of guide wheels showing the right-angled element which releases the guide wheel supports;

Figure 1:
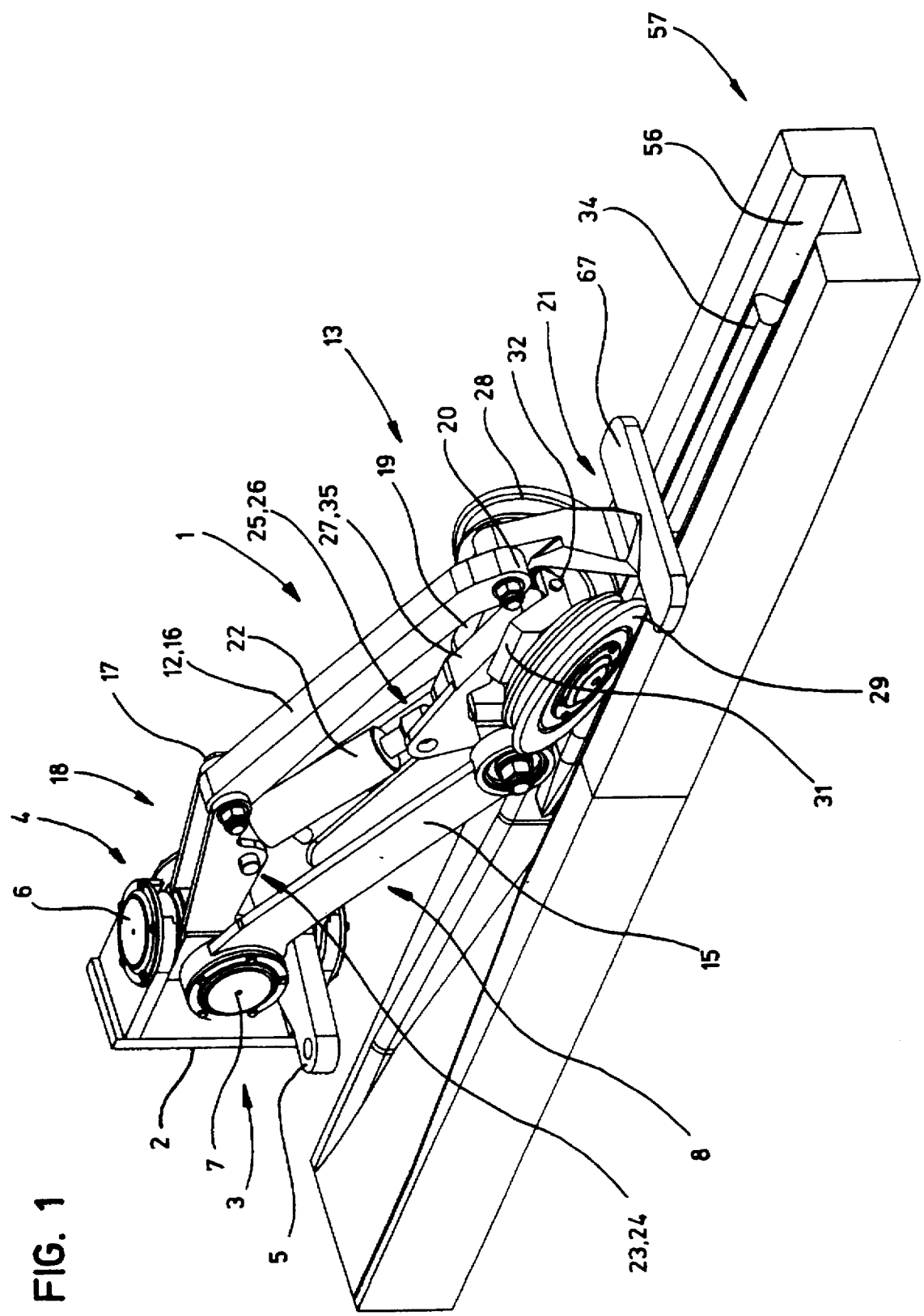
FIG. 1 is a general view, in perspective, of the improved automatic guide arm engaged on a guide rail.
Figure 2:
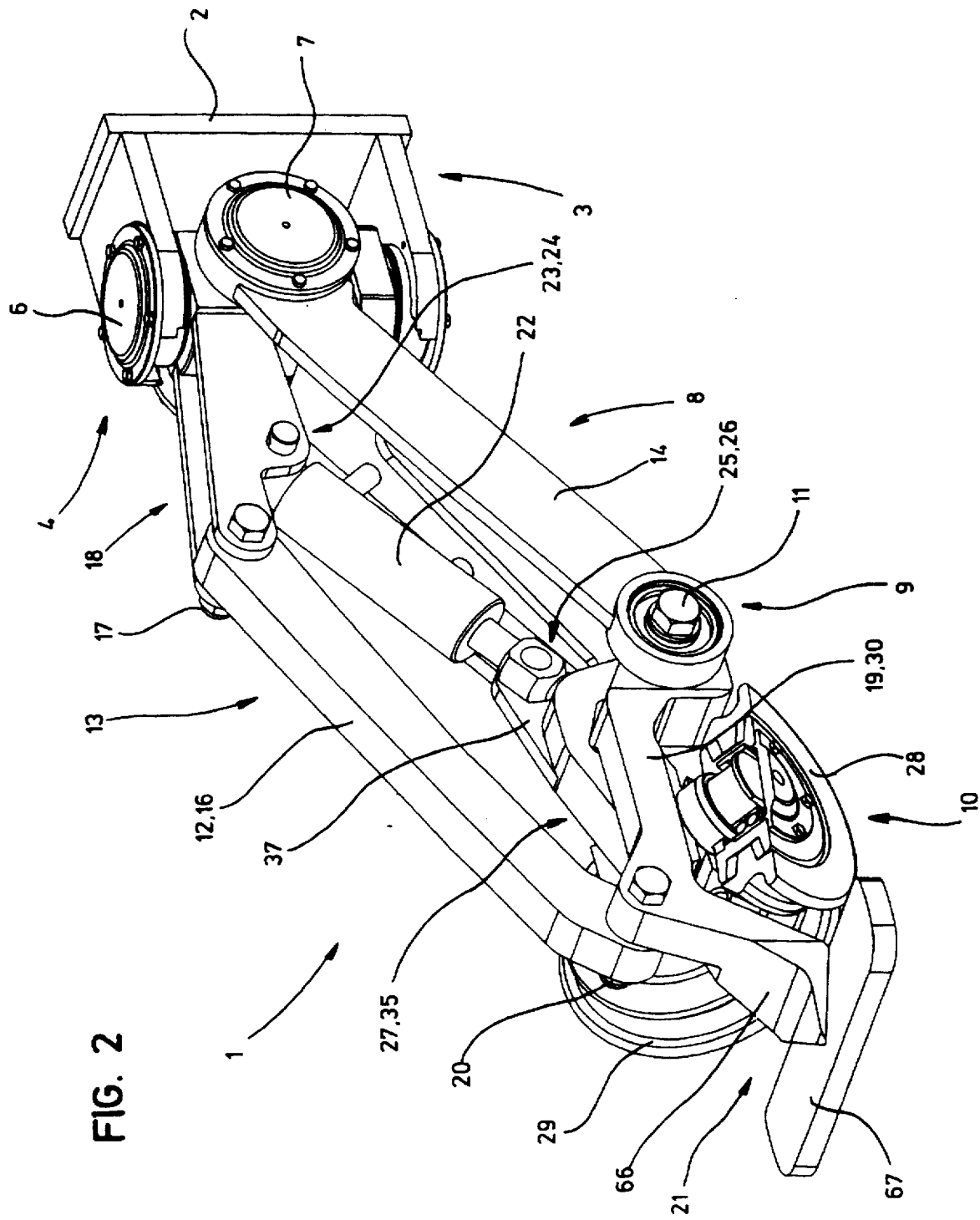
FIG. 2 is an oblique perspective of the fight front unit with one of the guide wheels in cross-section.
Figure 3:
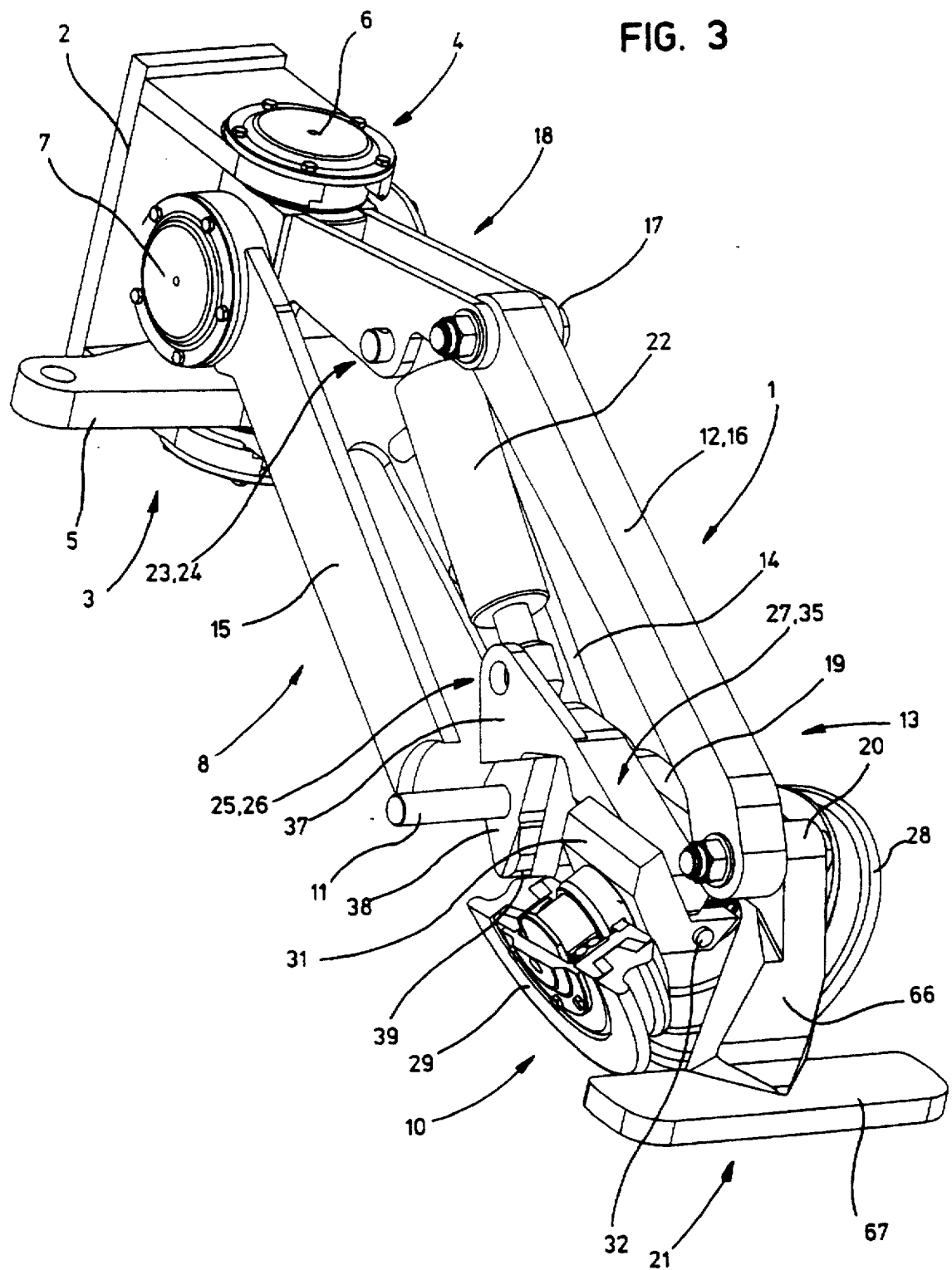
FIG. 3 is an oblique perspective of the left front unit with one of the guide wheels in cross-section.
Figure 4:
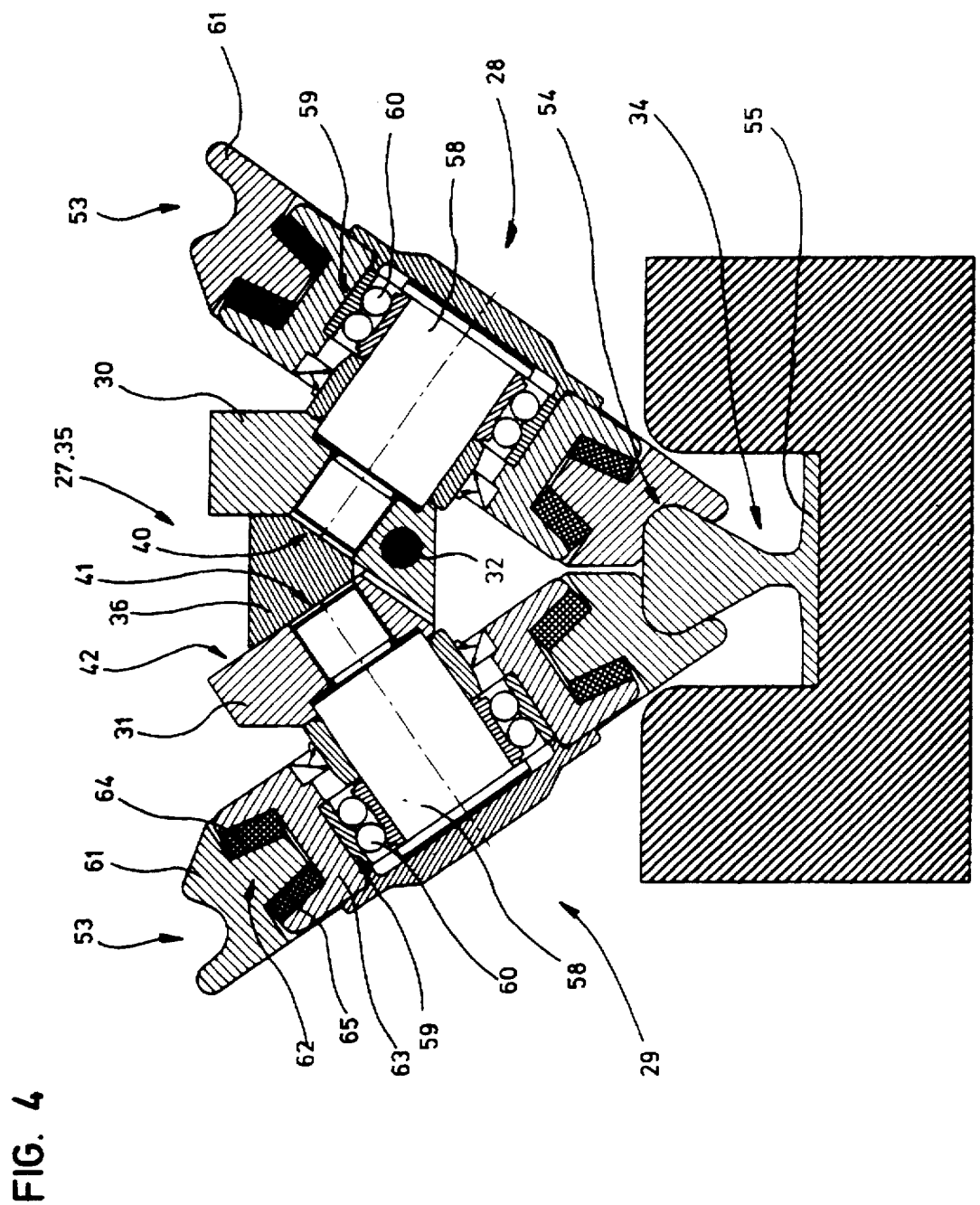
FIG. 4 is a transverse cross-section of a pair of guide wheels in working position, that is, while moving along the guide rail.
Figure 7:
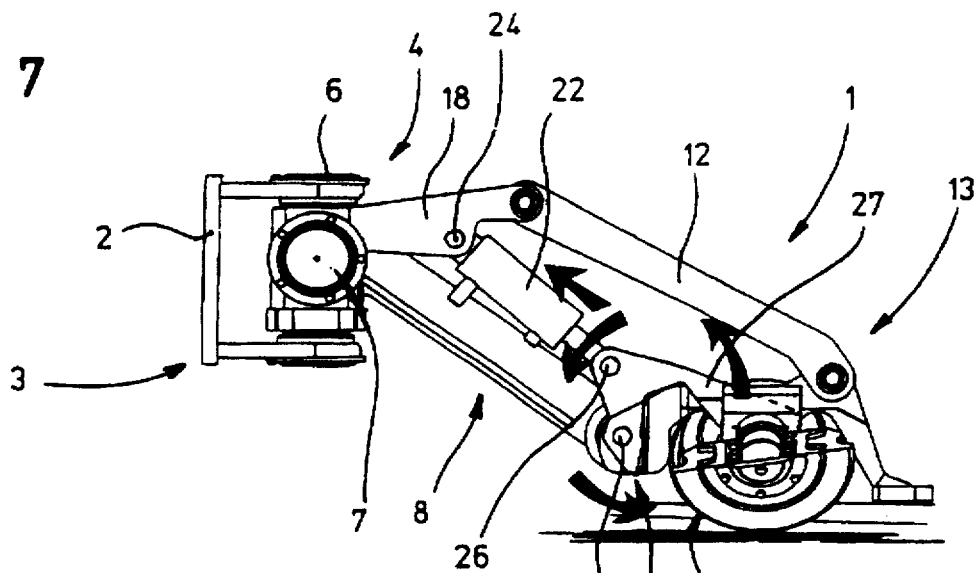
Figure 8:
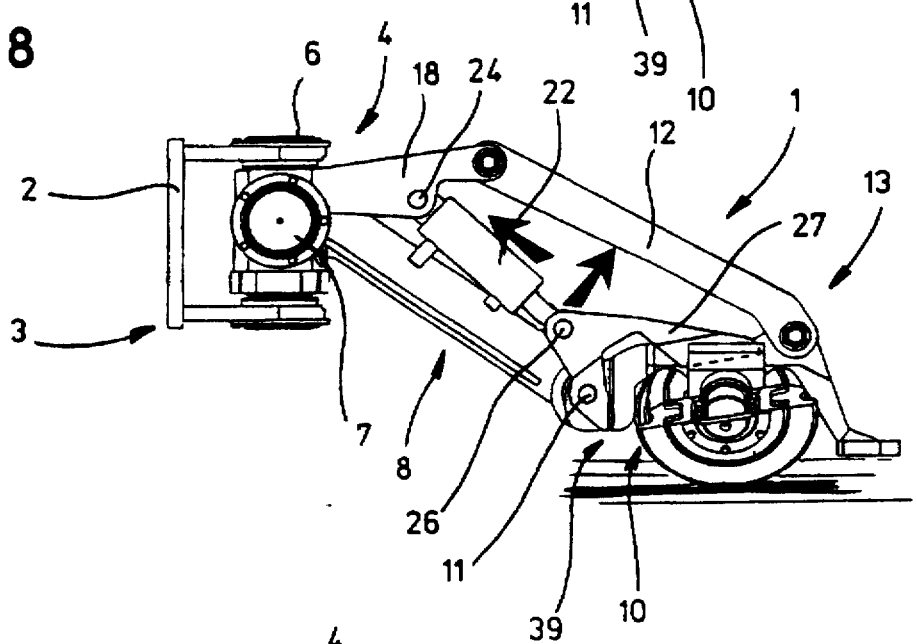
Figure 9:
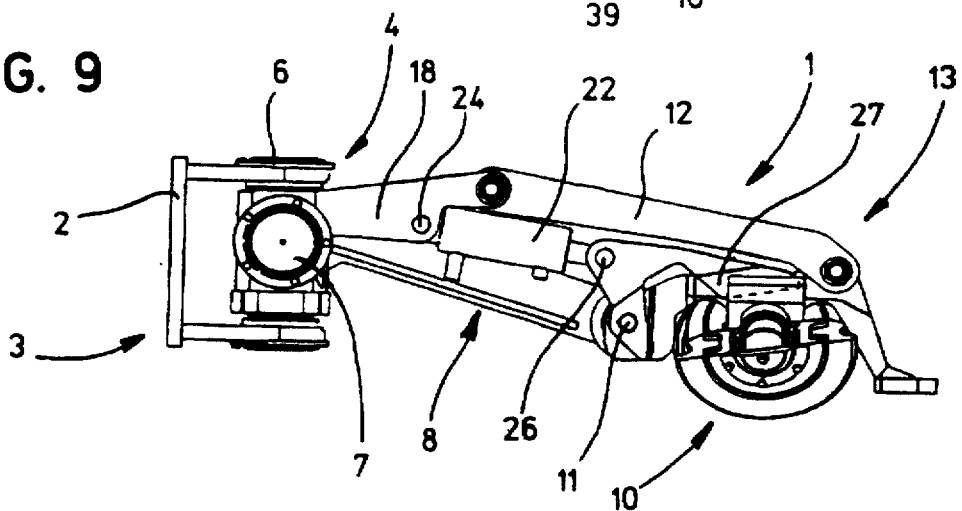
Figure 10:
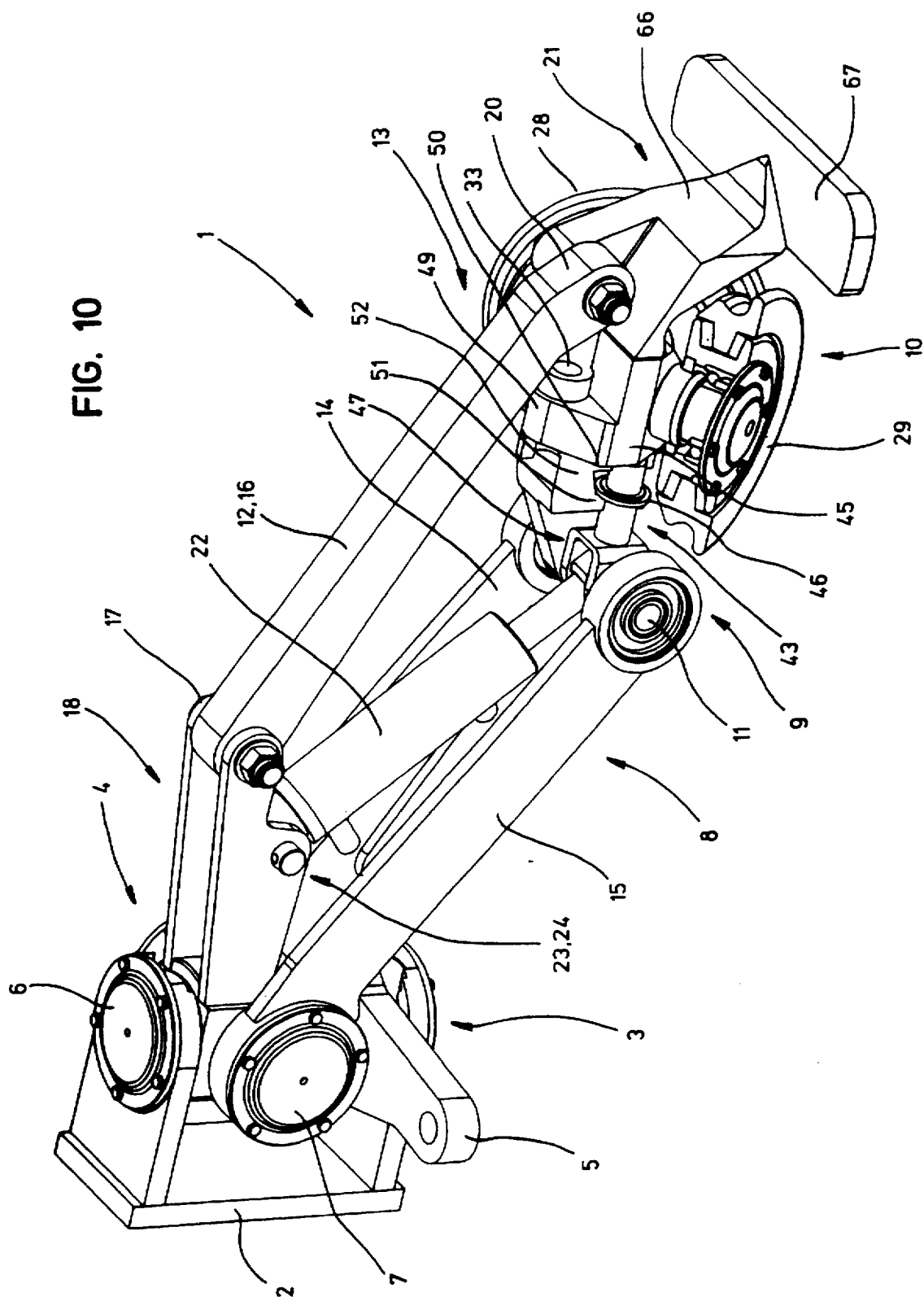
Figure 11:
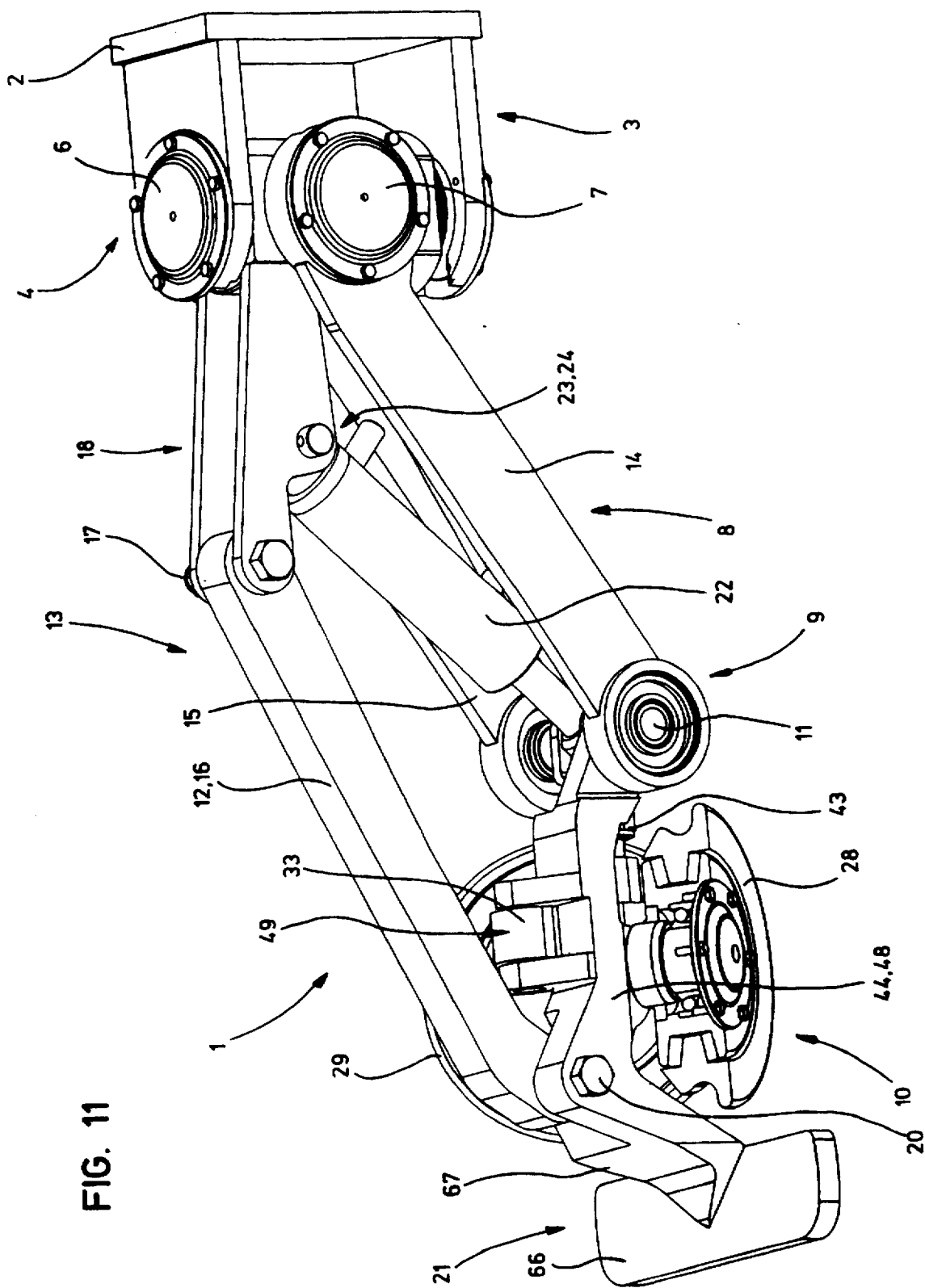

FIGS. 7, 8, and 9 are side views showing the position of the articulating elements when the arm is in the main kinematic phases;

FIG. 10 is a perspective of the left side showing an embodiment with a conical actuation device;

FIG. 11 is a perspective of the right side showing an embodiment with a conical separation device.

DESCRIPTION OF THE PREFERRED EMBODIMENT(S)

The improved, lifting, automatic guide arm according to the invention constitutes the primary directional unit in automatic directional guide system for a guide rail.

In this automatic directional guide system, the directional sensor consists of a guide arm 1 articulated to a Cardan joint on an end support 2 of the chassis of a road vehicle, constituting an articulating center 3 formed of a pivot block 4 extending laterally into a directional control lever 5. The pivot-block is pivotably attached to a vertical directional axle 6 and a horizontal rocker axle 7 traversing the pivot block 4, which supports guide arm 1 as it is raised and lowered vertically.

Guide arm 1 is shaped like an elongate rectilinear body with a deformable, hinged frame-like construction, consisting of several extensions of the same length articulated to two pivot axles of fixed height, which are interconnected first at the front by the last extension, and also at the back by an extension fixed in the plane of the arm's upward movement. The arm is formed, first, of an oblique lower structure 8 of constant length, pivotably connected at its upper end to pivot-block 4 by the horizontal rocker axle 7, and at its lower end 9, to the mechanical unit of a guide head 10 by a lower pivoting axle 11. Guide head 10 forms the last extension. The frame is then formed of the upper extension, an articulating connecting arm 12, which, together with oblique lower structure 8 and the other elements such as the last extension, comprise the deformable frame hereinafter referred to as articulated deformable parallelogram unit 13.

Lower oblique structure 8 consists of two parallel oblique rods 14 and 15, while connecting arm 12 is formed of a central lever 16 pivotably articulated first, by an upper pivoting axle 17, to upper forked element 18, and secondly, to a mechanical connector block 19 by front pivot axle 20. Mechanical connector block 19 extends into a protective support 21 at the front, and at the rear, extends as far as lower pivoting axle 11, which it supports, and to which oblique rods 14 and 15 are connected. This constitutes articulated unit 13 which is deformable when actuated by actuator 22 contacting each of its extremities. Upper extremity 23 of actuator 22 is pivotably articulated to upper forked element 18 near its free end by a pivot axle 24, and the lower extremity 25 of actuator 22 is pivotably articulated by axle 26 to a portion 27 of an angle control member for engaging the guide wheels on the guide rail or releasing them.

The guide wheel angle control member, influenced by the push or pull of actuator 22, using an angle element 27 which moves in relation to the guide head, releases or reconnects the guide wheels and locks them at the end of a course.

The specific elements involved will now be examined in more detail.

The angle control member is composed of the angle element 27 pivotably articulated to the extremity of the actuator shaft, either separately, or together with lower pivoting axle 11.

The guide head is equipped with directional means formed of two guide wheels 28 and 29 in a downward-pointing V-shaped arrangement, attached to two guide wheel supports 30 and 31 pivotably interconnected by an axle 32 or 33 which is lower or higher than angle element 27.

In the embodiment shown, one of the guide wheels is attached at an angle. The guide wheels move closer together or separate as one wheel moves in relation to the other.

In working position, the guide wheels lightly grip the edges of a guide rail 34 which engages them. They are maintained locked in position by slight pressure from the actuator, or by the play of the slight angle formed by the angle member, or by some other means.

They are held by two guide wheel supports 30 and 31 of variable shape, arranged so that the guide wheels 28 and 29 form a downward-pointing "V". The drive axles of the guide wheels are located on the outer surfaces of these supports.

A control device exerts a force which separates and moves together either one or both of the guide wheel supports, more specifically, actuator means 27 which is articulated to the extremity of the shaft of actuator 22.

Angle control member 27 can function in various ways. In general, it causes at least one of the guide wheel supports to pivot in relation to the other by displacing one guide wheel support.

Two embodiments of the numerous possible variations of angle control member 27 will be described herein: one with a right-angled design and one with a rod having a conical tip.

According to the first embodiment, guide wheel supports 30 and 31 together define a space which accommodates angle control member 27, which causes at least one of the two guide wheel supports to pivot on their common pivoting axle when it moves.

According to this first embodiment, the angle control member is a shoe 35 with a right-angled front portion 36.

The rear portion of this actuator has a projecting lateral plate 37 articulating it to the end of the actuator shaft. The lower portion 38 of the angle control member, generally angular, is pivotably articulated to the lower pivoting axle 11. In the embodiment shown, the front surface of the angled lower portion is the abutting surface 39 for a transverse element used to tip and raise the arm.

As indicated previously, the front extremity of the angle control element forms a right angle. The corner has a flat lateral upright surface, and an upper vertical surface extending downward into angled plane 40, and a flat lateral left surface 41, which is appropriately angled. Pivotably articulated guide wheel supports 30 and 31 each have flat, opposing interior lateral surfaces. Right support 30 is angled and has a flat interior lateral surface, which inclines from the vertical as left support 31 tilts, and has a flat interior lateral surface 42, which inclines to the same extent as articulated lateral surface 41 opposite fight-angled extremity 36.

The interior opposing lateral surfaces define a space which has at least one lateral wall capable of angular displacement.

These surfaces provide a sloped ramp which pushes control shoe 35, consisting here of the angled element, whose divergent end surfaces convert its forward and backward motion into a motion which separates the lateral walls of the receptor space, thus moving the guide wheels together to engage and grip the rail edges, locking onto them.

It should be noted here that the locking action may result either from the pressure remaining on the actuator after it is pushed, or from the angle of the angle control element, which is smaller than that of the fight-angled angle control member, or by some other means.

FIGS. 7, 8 and 9 show the general relative functions of the arm and guide wheel movements.

The lifting operation takes place in three phases, illustrated in succession by the above drawings, which can be viewed in conjunction with the transverse cross-section drawings.

Initially, the arm is in the lowered position, with the guide wheels engaging the rail, that is, gripping the rail lightly.

In this state, shoe 35 abuts the base of the receptor space and its front extremity, forming an angle control element for the guide wheels, is pushed down by the actuator and remains locked in this position due to slight pressure from the actuator or some other means. The angle control member first forces the left guide wheel to grip the rail itself, then the opposite guide wheel, in a mechanical reaction, does the same.

The raising operation begins when the guide wheel is released. It is released by the simple backward tilting movement of shoe 35 on axle 11 as the actuator moves. During this operation, the front extremity of shoe 35 lifts and thus disengages the left guide wheel support from movement.

The backward tilting movement of shoe 35 marks a stop, as the front surface of the lower extremity of the fight-angled portion then contacts the opposite abutting surface.

The continuing push of the actuator repositions the elements of deformable unit 13: oblique interior structure 8 moves toward the upper portion of the arm at the same time as the arm extends slightly, into the position shown in FIG. 9, where the arm is raised and the guide wheels are released.

Thus, the invention offers a mechanism which automatically raises and controls the angled guide wheels, activated solely by an actuator which controls the various functions and their successive effects.

The pull of the actuator automatically releases the guide wheels in succession and raises the unit.

Conversely, the push of the actuator lowers the unit and locks the angled guide wheels in engagement with the guide rail.

According to the second embodiment, shown in FIGS. 10 and 11, the actuator is an angled shaft 43 with a conical extremity whose forward or reverse rectilinear movement is convened into an action that causes fight guide wheel support 44 and left guide wheel support 45 to either separate or move toward each other.

Angled shaft 43 has a flanged diametrical projection 46 at its approximate mid-point.

This angled shaft 43 is pivotably articulated to the extremity of the actuator shaft with a housing 47 traversed by lower pivoting axle 11.

In this embodiment, the mechanical connecting block of articulated unit 13, reference numeral 48, always maintains guide wheel support 44 at a fixed angle. On its upper edge there is a pivoting articulation 49 connecting the variable angle support for left guide wheel 45.

Pivot axle 33, which holds the guide wheel supports and thus the guide wheels, is moved upward above angle member 43, and thus variable angle left guide wheel support 45 utilizes a pendular technique. The embodiment shown in FIGS. 10 and 11 shows a mechanical block pivoting at the top, with an oblique lateral outer guide wheel support surface and an upper extension traversed by the upper pivoting axis.

The body of left guide wheel support 45 comprises a receptor space using the same principle of converting translational movement into pivoting movement, with the cooperation of a ramp that is conical, or simply angled, with a movable control element exerting a force which moves the guide wheel supports 44 and 45 together, and releases them in the opposite direction.

Flange 46 provides a block between front and rear surfaces 50, 51 of an upper opening 52 which determines the direction of the actuator means. Additional pushing by the actuator causes articulated unit 13 to tilt and lift.

The guide wheels have a groove 53 contacting the edge 54 of guide rail 34 as they follow the rail.

It is possible to use rails which are triangular, round, heart-shaped, or whatever, with the base 55 incorporating a soundproofing layer at the bottom of groove 56 of the prefabricated rectilinear channels 57 comprising the rail.

Each of the guide wheels is identical in construction. They are composite structures formed of a longitudinal axle or a spindle axle 58 integral with each guide wheel support, connected to a rotating hub 59 by a bearing 60.

There is a tread 61 in the peripheral groove of hub 59 joined by a layer 62 on the rim 63 made of elastic material, such as elastomer, formed of two washers 64 and 65 arranged in a "V", constituting a deformable intermediate element which absorbs the displacements caused by functional play, as well as lateral deviation on curves.

These flexible treads form a cushion against vibrations and provide electrical insulation.

Thus, the invention offers a system for engaging two guide wheels on rails, which is self-locking either due to the pressure of the actuator or the play between a slightly inclined ramp and the angle control member.

The technical forms and functions allow the actuator to automatically separate the guide wheels during the first lifting phase, then to move them together and engage the rail during the final lowering phase.

The protective support 21 in front of the guide wheels is formed of a concave arm 66 extending into a horizontal transverse plate 67 located just above the rail. The support is integral with the deformable, articulated unit, and it retracts along with it when the unit is raised.

I claim:

1. A lifting guide arm for automatically guiding a road vehicle along a guide rail, said lifting guide arm comprising:
    a movable support having a guide portion and a control portion, said control portion being articulably supportable by a vehicle via an articulated joint, said articulated joint having a vertical directional axle and a horizontal rocker axle, and said articulated joint being mechanically controlled by a directional control mechanism;
    an actuator being attached between said articulated joint and said guide portion of said movable support for adjustably positioning said movable support;
    a first guide wheel support and a second guide wheel support respectively supporting a first guide wheel and a second guide wheel, said first and second guide wheels being arranged in a V-shaped configuration with each of said first and second guide wheels having a circumferential groove formed therein for engaging a portion of said guide rail, and both of said guide wheel supports being mounted on said guide portion;
    wherein at least one of said guide wheel supports is pivotally mounted to said guide portion, via a guide wheel support pivot, to allow relative movement between said first and second guide wheels and facilitate engagement and disengagement of said first and second guide wheels with a portion of said guide rail.

2. The lifting guide arm according to claim 1, wherein said movable support further comprises:
    a deformable parallelogram unit articulable by said actuator in a vertical plane, and said actuator has an upper extension and a lower extension for adjusting said deformable parallelogram unit between a raised and a lowered position;
    said upper and lower extensions are connected to an upper and a lower actuator axle, and a height of said upper actuator axle remains constant as said lower actuator axle is at least one of raised and lowered by said actuator;
    said lower actuator axle is located adjacent to, and cooperating with, said guide wheel supports for at least one of raising, lowering and pivoting said guide wheels during raising and lowering operations.

3. The lifting guide arm according to claim 1, wherein said first guide wheel support is fixed and said second guide wheel support is movable about said guide wheel support pivot, relative to the fixed guide wheel support, via an angle control member cooperating with said actuator.

4. The lifting guide arm according to claim 3 wherein said fixed guide wheel support forms a leading edge of said deformable parallelogram.

5. The lifting guide arm according to claim 1, wherein said first and second guide wheel supports are maintained in a fixed position, relative to one another, during at least one of a raising and a lowering operation of said movable support.

6. The lifting guide arm according to claim 3, wherein said angle control member has an upper and a lower portion and said guide wheel support pivot is located below said lower portion of said angle control member.

7. The lifting guide arm according to claim 3, wherein said angle control member is a tiltable shoe controlled by said actuator, via said lower actuator axle, and said actuator controls the tilt of said shoe by rotating said shoe about a lower pivoting axle of said deformable parallelogram; and
    said shoe carries said guide wheel supports such that lowering of said shoe adjusts at least one of said guide wheel supports whereby said first and second guide wheels are brought into proximity with one another for engagement with said rail, and when said shoe is raised said at least one guide wheel support is readjusted thereby separating said first and second guide wheels from one another to facilitate disengagement from said rail.

8. The lifting guide arm according to claim 7, wherein an extremity of said shoe has an inclined surface which cooperates with a substantially equally inclined and opposite rear surface of the adjustable guide wheel supports so that said shoe moves at least one of said first and second guide wheel supports, and thereby the guide wheels, to facilitate engagement and disengagement from said rail, during at least one of a lowering and a raising operation.

9. The lifting guide arm according to claim 3, wherein said actuator maintains said angle control member locked in said lowered position via a locking mechanism.

10. The lifting guide arm according to claim 3, wherein said actuator is constantly pressurized with fluid, when said angle control member is in said lowered position, thereby to maintain said guide wheels in a locked position.

11. The lifting guide arm according to claim 8, wherein said inclined surface of said angle control member has a slope.

12. The lifting guide arm according to claim 6, wherein said guide wheel support pivot is located above said upper portion of said angle control member.

13. The lifting guide arm according to claim 3, wherein said angle control member comprises:

a rod coupled to said actuator for controlling movement of said rod, said rod has a conical extremity for engaging and pivoting at least one said guide wheel support relative to said rod movement, and said rectilinear movement of said rod is limited by a front stop and a rear stop.

14. The lifting guide arm according to claim 11, wherein each said guide wheel further comprises:

a rotatable hub;

a rim supported by said hub, and said rim has a circumferential groove formed therein; and a tread of flexible insulating material is secured circumferentially around said rim, within said groove, for engagement with said rail during use of said movable support.

15. The lifting guide arm according to claim 14, wherein a deformable intermediate layer is interposed between said hub and said rim, and said deformable intermediate layer has a truncated V-shape section formed therein by first and second juxtaposed conical washers.

* * * * *